United States Patent
Pan

(10) Patent No.: US 11,119,370 B2
(45) Date of Patent: Sep. 14, 2021

(54) DISPLAY PANEL

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 144 days.

(21) Appl. No.: 15/883,046

(22) Filed: Jan. 29, 2018

(65) Prior Publication Data
US 2019/0235327 A1 Aug. 1, 2019

(51) Int. Cl.
*G02F 1/1362* (2006.01)
*G02F 1/1335* (2006.01)

(52) U.S. Cl.
CPC .. *G02F 1/136209* (2013.01); *G02F 1/133502* (2013.01)

(58) Field of Classification Search
CPC .................. G02F 1/136209; G02F 1/133502
See application file for complete search history.

(56) References Cited

U.S. PATENT DOCUMENTS

| | | | | |
|---|---|---|---|---|
| 5,673,127 A * | 9/1997 | Takahara | .......... | G02F 1/133345 348/E9.027 |
| 6,303,262 B1 * | 10/2001 | Takaoka | .......... | G03F 1/54 430/227 |
| 10,488,563 B2 * | 11/2019 | Wu | .......... | G02F 1/133512 |
| 2005/0162597 A1 * | 7/2005 | Wachi | .......... | G02F 1/1337 349/138 |
| 2007/0184363 A1 * | 8/2007 | Kim | .......... | G02B 5/223 430/7 |
| 2007/0258137 A1 * | 11/2007 | Kamijima | .......... | G02B 5/045 359/431 |
| 2008/0309235 A1 * | 12/2008 | Yamazaki | .......... | H01L 27/3272 313/512 |
| 2009/0246415 A1 * | 10/2009 | Horie | .......... | G02B 1/11 428/1.3 |

(Continued)

FOREIGN PATENT DOCUMENTS

| | | |
|---|---|---|
| CN | 103725196 | 4/2014 |
| JP | 2003270403 | 9/2003 |
| JP | 2004245916 | 9/2004 |

(Continued)

OTHER PUBLICATIONS

Google patent translation of JP-2012150418-A (Year: 2012).*

(Continued)

*Primary Examiner* — Lucy P Chien
(74) *Attorney, Agent, or Firm* — JCIPRNET

(57) ABSTRACT

A display panel according to an embodiment has a first region and a second region beside the first region, and includes a top substrate, a bottom substrate and a display layer disposed between the top and the bottom substrate. The top substrate comprises a support plate having an outer surface, a patterned light shielding layer disposed on the outer surface of the support plate and located within the first region, and a patterned anti-reflective layer disposed on the outer surface of the support plate and being blank at the first region. The patterned light shielding layer of the display panel may be formed on the outer surface of the support plate via a wet process and may be patterned with sharp edges and good linearity to provide the desirable light shielding effect.

21 Claims, 13 Drawing Sheets

(56) References Cited

U.S. PATENT DOCUMENTS

2014/0098330 A1* 4/2014 Nam ............... G02B 5/201
349/96
2015/0179586 A1 6/2015 Youk et al.

FOREIGN PATENT DOCUMENTS

| JP | 2012088684 | 5/2012 |
| TW | 201540759 | 11/2015 |
| TW | 201730000 | 9/2017 |

OTHER PUBLICATIONS

"Office Action of Japan Counterpart Application," dated Apr. 16, 2019, p. 1-p. 4.
"Office Action of Taiwan Counterpart Application," dated Dec. 21, 2018, p. 1-p. 7.

* cited by examiner

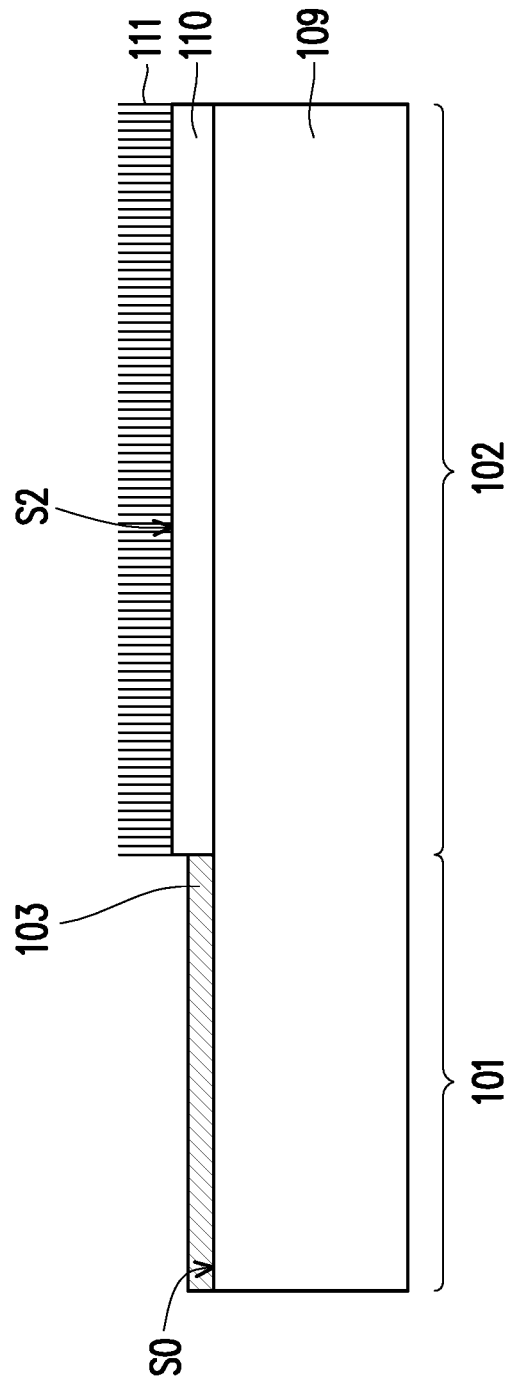
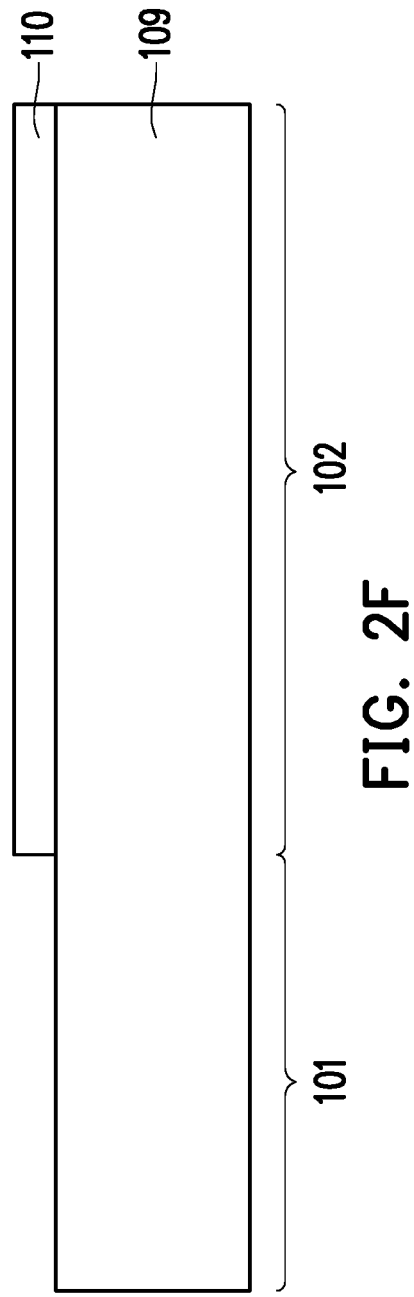

DISPLAY PANEL

BACKGROUND OF THE INVENTION

1. Field of the Invention

The present invention generally relates to an electronic device, in particular, to a display panel.

2. Description of Related Art

A patterned light shielding layer is usually added to a display panel to delineate the display area. The patterned light shielding layer can be a black matrix, have a frame-like pattern, or a matrix-like pattern, and the region surrounded by the frame-like pattern or the matrix-like pattern serves as the display region. Besides defining the display area, the patterned light shielding layer might also prevent unwanted light leakage.

In a typical liquid crystal display panel, a layer comprising liquid crystal material is sandwiched between a top and a bottom substrate layers. The top substrate and the bottom substrate are kept together via a sealant or an adhesive to form a liquid crystals cell. Once the cell is assembled, a light shielding layer is formed on the outer surface of the top substrate via a wet process such as ink-jet, screen or APR printing. The patterned light shielding layer is disposed on a non-display region of the display to prevent light-leakage and to improve the display contrast. The linearity and sharpness of the edges of the patterned light shielding layer formed with wet processes tend to be far from ideal, resulting in poorer shielding effect and worse contrast than what could be obtained if straight and sharp edges were produced when forming the patterned light shielding layer.

SUMMARY OF THE INVENTION

Accordingly, the present invention is directed to a display panel including a light shielding layer with a sharp pattern.

Accordingly, the present invention is directed to a method of fabricating a top substrate of a display panel to obtain a light shielding layer on the top substrate with a sharp pattern.

According to an embodiment, a display panel may have a first and a second region. A display panel includes a top substrate, a bottom substrate, and a display medium layer disposed between the top and the bottom substrates. The top substrate includes a support plate having an outer surface, a patterned anti-reflective layer disposed on the outer surface of the support plate and being blanked out at the first region, and a patterned light shielding layer disposed on the outer surface of the support plate and located within the first region.

According to an embodiment, the top substrate may further include a protective layer disposed on the outer surface of the support plate and cover the patterned light shielding layer.

According to an embodiment, the protective layer may be located in both the first region and the second region.

According to an embodiment, the protective layer may present a first thickness in the first region and a second thickness in the second region, and the first thickness is greater than the second thickness.

According to an embodiment, a top surface of the protective layer may be coplanar with a top surface of the patterned anti-reflective layer.

According to an embodiment, the top substrate may be more hydrophobic at the second region than at the first region.

According to an embodiment, a top surface of the patterned anti-reflective layer may be modified, and a hydrophobic layer may be formed on the top surface of the patterned anti-reflective layer.

According to an embodiment, the top substrate may further include an underlying layer disposed between the patterned light shielding layer and the support plate.

According to an embodiment, a top surface of the underlying layer may be modified, and a hydrophobic layer may be formed between the underlying layer and the patterned light shielding layer.

According to an embodiment, the material of the patterned anti-reflective layer may be different from a material of the underlying layer.

According to an embodiment, the patterned light shielding layer may be disposed in direct contact with the outer surface of the support plate.

According to an embodiment, the support plate may present a recess in the first region of the display panel, and the patterned light shielding layer may be disposed into the recess of the support plate.

According to an embodiment, the bottom surface of the patterned light shielding layer is coplanar to the bottom surface of the patterned anti-reflective layer.

According to an embodiment, the top surface of the patterned light shielding layer is coplanar to a bottom surface of the patterned anti-reflective layer.

According to an embodiment, a method of fabricating a top substrate of a display panel may include the following steps. The display panel may include a top substrate, a bottom substrate and a display medium layer between the top substrate and the bottom substrate. A support plate with an anti-reflective layer thereon is provided. A portion of the anti-reflective layer in a first region is removed to form a patterned anti-reflective layer. A patterned light shielding layer is formed on the support plate in the first region where the portion of the anti-reflective layer is removed.

According to an embodiment, a hydrophobic layer is further formed on the support plate with the patterned anti-reflective layer thereon through a hydrophobic modification before forming the patterned light shielding layer.

According to an embodiment, the hydrophobic layer in the first region is removed before forming the patterned light shielding layer.

According to an embodiment, an underlying layer is further formed on the support plate in the first region before the hydrophobic modification, wherein the hydrophobic layer is also formed on the underlying layer during the hydrophobic modification and a distribution density of hydrophobic material on the underlying layer is less than a distribution density of hydrophobic material on the patterned anti-reflective layer.

According to an embodiment, an underlying layer is further formed on the support plate in the first region, wherein the patterned light shielding layer is formed on the underlying layer.

According to an embodiment, the support plate is partially removed at the first region during patterning the anti-reflective layer into the patterned anti-reflective layer to have a recess.

According to an embodiment, a protective layer covering the patterned light shielding layer is further formed.

According to an embodiment, the protective layer is formed to further cover the anti-reflective layer in the second region.

According to an embodiment, the patterned light shielding layer is formed on the support plate in the first region by performing an ink jet printing process.

According to an embodiment, the patterned light shielding layer is formed on the support plate in the first region by performing a super ink jet printing process.

In view of the above, the patterned light shielding layer is disposed on the outer surface of the support plate at the first region of the display panel. The first region may be revealed by the patterned anti-reflective layer on the support plate, or it may be described by a recess of the support plate. The patterned light shielding layer may present sharp edges with good linearity while the patterned light shielding layer is formed on the top substrate via a wet process. Accordingly, the patterned light shielding layer of the display panel may provide the desired light shielding function without deteriorating the contrast of the displayed image, so as to improve the quality of the display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2C-2E shows schematic cross sections of a top substrate undergoing a portion of the steps of fabricating a top substrate in accordance with an embodiment of the present disclosure.

FIGS. 2F-2G shows schematic cross sections of a top substrate undergoing a portion of the steps of fabricating a top substrate in accordance with another embodiment of the present disclosure.

Figure 1A:
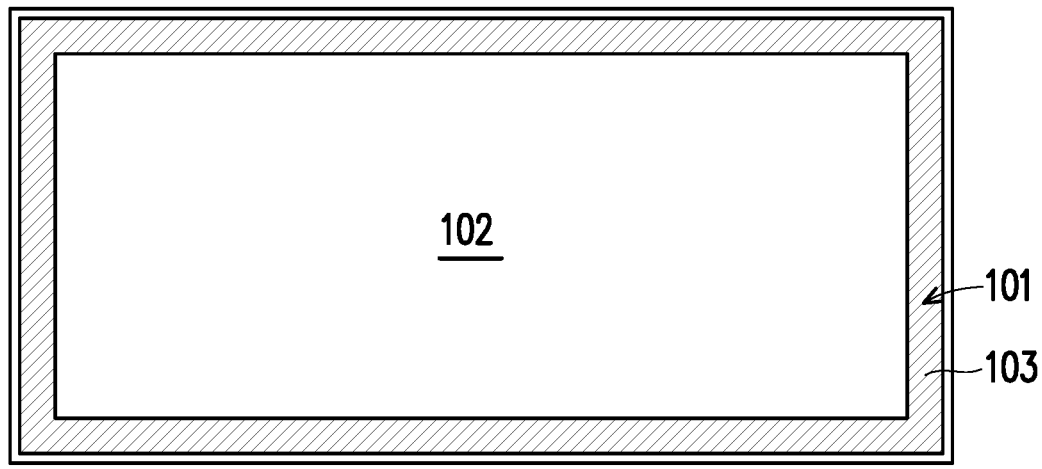
FIG. 1A schematically illustrates a top view of a display panel in accordance with an embodiment of the present disclosure.

In the drawings, the hydrophobic layers 111 and 114 are represented with a significantly enlarged thickness compared to the other components of the embodiments for the sake of clarity of the drawings.

DESCRIPTION OF THE EMBODIMENTS

Reference will now be made in detail to the present preferred embodiments of the invention, examples of which are illustrated in the accompanying drawings.

Wherever possible, the same reference numbers are used in the drawings and the descriptions to refer to the same or like parts.

In the disclosure of the present invention, the locution "an element A is disposed on an element B", used to describe a positional relationship, encompasses the possibilities of one or multiple other elements disposed between the element A and the element B, as well as the case of no other elements existing between the element A and the element B.

Figure 1B:
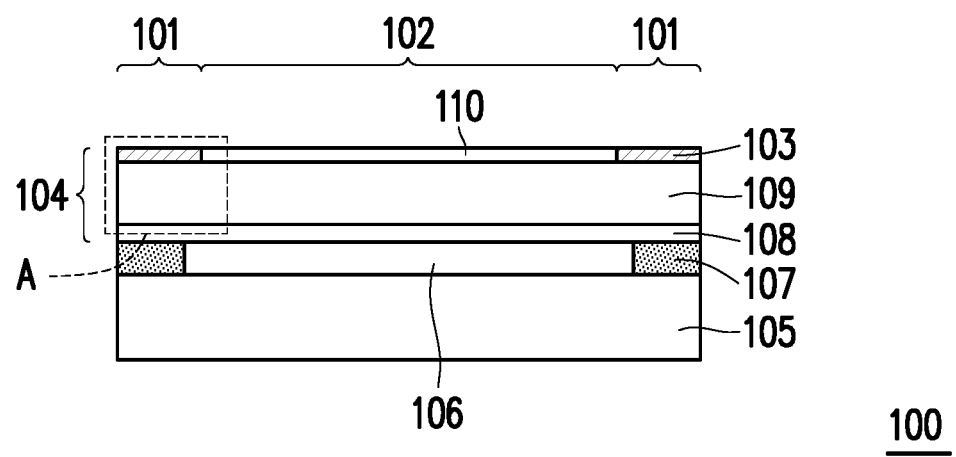
FIG. 1B schematically illustrates a cross section of the display panel in FIG. 1A.

FIGS. 1A and 1B schematically illustrate a top view and a cross section, respectively, of a display panel 100 in accordance with an embodiment of the present disclosure. The display panel 100 may include a first region 101 and a second region 102 beside the first region 101. The first region 101 may have a frame-like pattern when viewed from the top, and may surround the second region 102. In addition, the display panel 100 may have a patterned light shielding layer 103 located within the first region 101. Specifically, the patterned light shielding layer 103 has a frame-like pattern in the present embodiment. The first region 101 may be considered as the region where the patterned light shielding layer 103 is disposed. The patterned light shielding layer 103 has a light shielding effect. Therefore, the display light of the display panel 100 is obstructed or shielded by the patterned light shielding layer 103, so that the displayed image is presented in the second region 102 that may be considered as the display area. In an alternative embodiment, the patterned light shielding layer 103 may be disposed following other patterns or layers, according to the requirements of the design.

As shown in a cross section of FIG. 1B, the display panel 100 includes a top substrate 104, a bottom substrate 105 opposite to the top substrate 104, and a display medium layer 106 and a sealant 107 disposed in between the top and the bottom substrates 104 and 105. The display medium layer 106 is disposed between the top substrate 104 and the bottom substrate 105, and is surrounded by the sealant 107. The display medium layer 106 may be made of liquid crystals, so that the top substrate 104, the bottom substrate 105, the display medium layer 106, and the sealant 107 may serve as a liquid crystal cell, but it is not limited thereto. The top substrate 104 may include the patterned light shielding layer 103, an electrode layer 108, a support plate 109, and a patterned anti-reflective layer 110. The patterned light shielding layer 103 and the patterned anti-reflective layer 110 are disposed at the same surface of the support plate 109. The patterned anti-reflective layer 110 is patterned to be absent in the first region 101 and the patterned light shielding layer 103 is disposed within the first region 101. The electrode layer 108 is disposed at a side closer to the display medium layer 106. In addition, though the drawing presents the bottom substrate 105 as a plate-like structure, the bottom substrate 105 may be a transistor array substrate that comprises another support substrate such as a glass plate, or a silicon backplane (not shown) and a transistor array such as a thin film transistor array or a CMOS (Complementary Metal-Oxide Semiconductor) device array (not shown) thereon, wherein the transistor array and the electrode layer 108 may be used for providing the driving electric field to drive the display medium layer 106. Accordingly, the display panel 100 may be a Thin Film Transistor Liquid Crystal Display (TFT-LCD) panel or an LCoS (Liquid Crystal on Silicon) display panel. In some alternative embodiments, the electrode layer 108 may be omitted based on the driving circuit design of the display panel 100. The electrode layer 108 may be made of ITO or other conductive material that is conductive and allows the display light to pass through, and the support plate 109 may be made of glass, but they are not limited thereto. The patterned light shielding layer 103 formed in the first region 101 where the patterned anti-reflective layer 110 is absent may present sharp edges with good linearity so that the quality of the display panel 100 is improved.

Figure 2A:
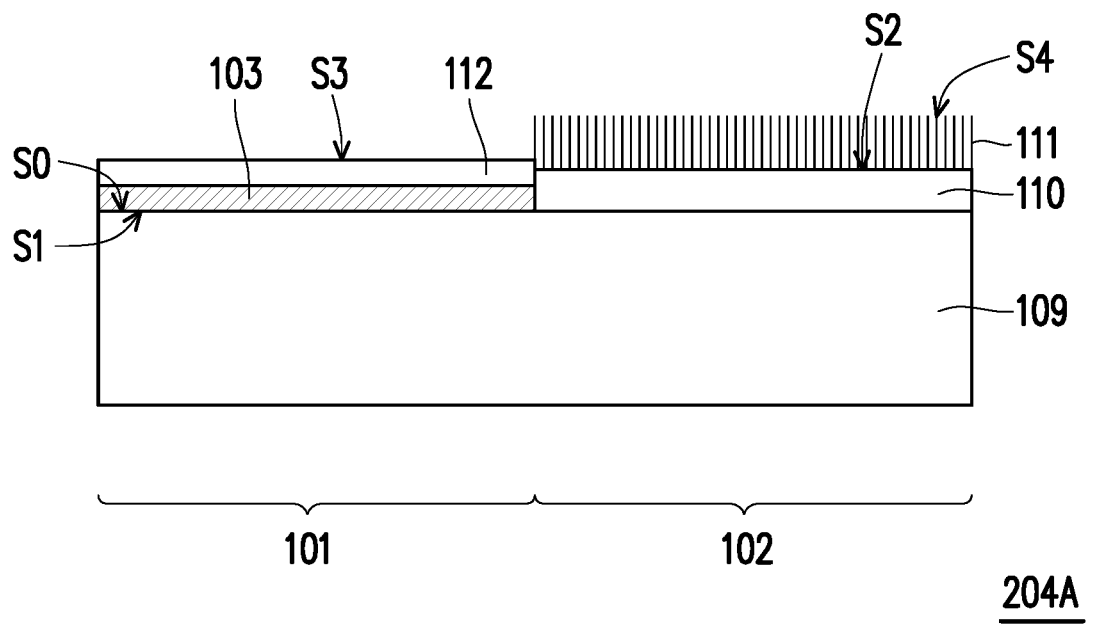
FIG. 2A shows an expanded view of a cross section of a top substrate of a display panel according to another embodiment of the present disclosure.

FIG. 2A shows an expanded view of a cross section of a top substrate of a display panel according to another embodiment of the present disclosure. The expanded view of the top substrate 204A shown in FIG. 2A corresponds to an area A delineated in FIG. 1B. The structure of the top substrate 204A shown in FIG. 2A may be an exemplary implementing example of the top substrate 104 of the display panel 100. In FIG. 2A, a top substrate 204A of the display panel may include a support plate 109 having an outer surface S0, a patterned light shielding layer 103, and a patterned anti-reflective layer 110. The patterned light shielding layer 103 and the patterned anti-reflective layer 110 may be disposed on the outer surface S0 of the support plate 109 and the bottom surface S1 of the patterned light shielding layer 103 may be coplanar with the bottom surface of the patterned anti-reflective layer 110. In addition, the top substrate 204A may further include a protective layer 112 formed on top of the patterned light shielding layer 103, in the first region 101 of the display panel.

In the present embodiment, the top surface S2 of the patterned anti-reflective layer 110 may be subjected to a hydrophobic modification such as a silane surface treatment to form a layer of hydrophobic material. In a microscopic view, the top surface S2 of the patterned anti-reflective layer 110 may be functionalised with the hydrophobic material to form a hydrophobic layer 111, thus gaining hydrophobic properties. The material forming the hydrophobic layer 111 may include silanes, fluorinated silanes, long-chain alcohols or acids, but it is not limited thereto. Specifically, the material forming the hydrophobic layer 111 may contain hydroxyl groups to react with the top surface S2 of the anti-reflective layer 110. A material of the patterned anti-reflective layer 110 may be silicon oxide ($SiO_x$), titanium oxide ($TiO_x$) or a combination of both exposing surface hydroxyl groups which may react with the hydrophobic material to form the hydrophobic layer 111. The patterned anti-reflective layer 110 may be a stacked multi-layer thin film which may have a stacking structure of $SiO_x$—$TiO_x$—$SiO_x$—$TiO_x$—$SiO_x$, for example, but it is not limited thereto. The thickness of each individual $SiO_x$ layer in the stacked multi-layer thin film may be in a range from 5 nm to 300 nm, while the thickness of each individual $TiO_x$ layer in the stacked multi-layer thin film may be in a range from 5 nm to 100 nm. The reflective indexes at wavelength of 550 nm of a $SiO_x$ layer and a $TiO_x$ layer may be close to 1.5 and 2.3, respectively.

The patterned anti-reflective layer 110 may be patterned in such a way to be retained only in the second region 102, and expose the support plate 109 in the first region 101. Therefore, the patterned light shielding layer 103 may be formed to be in direct contact with the outer surface S0 of the support plate 109 in the first region 101 of the display panel via a wet process such as an ink-jet printing process, a screen printing process, an APR printing process, a super ink-jet printing process or the like. The material of the patterned light shielding layer 103 may include organic dye material, but the disclosure is not limited thereto. In addition, the patterned anti-reflective layer 110 reveals the first region 101 so that the bottom surface S1 of the patterned light shielding layer 103 may be coplanar with the bottom surface of the patterned anti-reflective layer 110. In some alternative embodiments, the bottom surface S1 of the patterned light shielding layer 103 may be lower than the bottom surface of the patterned anti-reflective layer 110, or a thinned anti-reflective layer may remain on the first region 101 so that the bottom surface S1 of the patterned anti-reflective layer 103 may be higher than the bottom surface of the patterned anti-reflective layer 110.

The protective layer 112 disposed on the support plate 109 covers the patterned light shielding layer 103. A material for the protective layer 112 may be an oxide. More specifically, the protective layer 112 may be made of $TiO_2$, $SiO_2$, $Al_2O_3$, ITO or ZnO, but is not limited thereto. A thickness of the protective layer 112 deposited on the patterned light shielding layer 103 may vary, so that in some embodiments, the top surface S3 of the protective layer 112 may be coplanar with the top surface S2 of the patterned anti-reflective layer 110, whilst in other embodiments the top surface S3 of the protective layer 112 may lie between a plane defined by the top surface S2 of the patterned anti-reflective layer 110 and a plane defined by a top surface S4 of the hydrophobic layer 111. In the drawings, the hydrophobic layer 111 is represented with a significantly enlarged thickness compared to the other components of the embodiment for the sake of clarity of the drawings. Generally, a thickness of the hydrophobic layer 111 may be from less than a nanometer to tens of nanometers, for example, 0.1 to 90 nanometers.

Figure 2B:
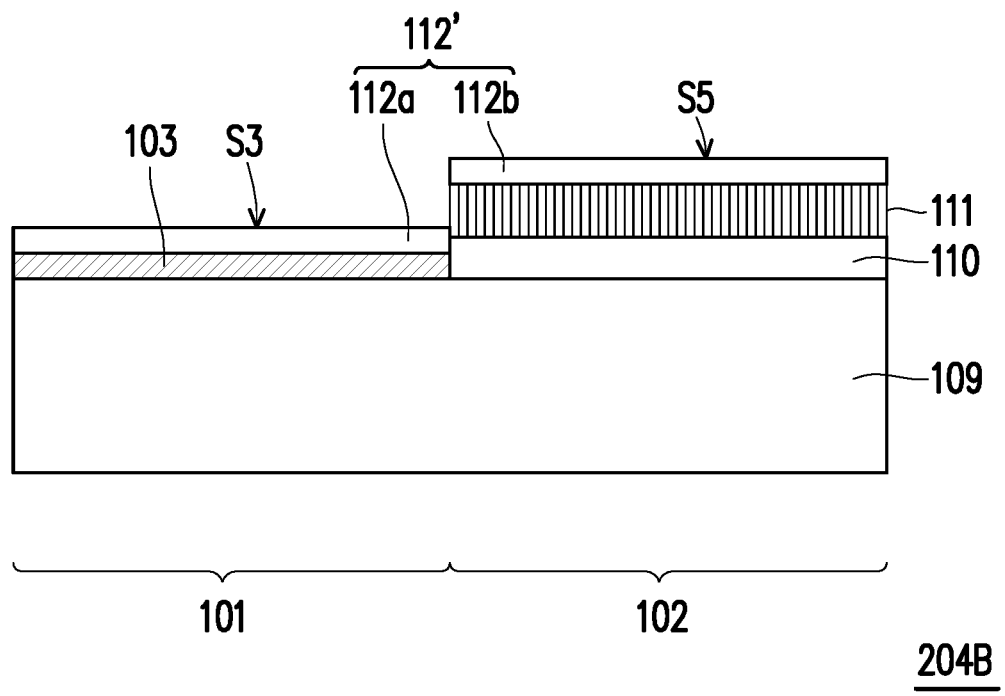
FIG. 2B shows an expanded view of a cross section of the top substrate of a display panel according to another embodiment of the present disclosure.

FIG. 2B shows an expanded view of a cross section of the top substrate of a display panel according to another embodiment of the present disclosure. The expanded view of the top substrate 204B shown in FIG. 2B corresponds to an area A delineated in FIG. 1B. The structure of the top substrate 204B shown in FIG. 2B may be an exemplary implementing example of the top substrate 104 of the display panel 100. The top substrate 204B shown in FIG. 2B is similar to the top substrate 204A shown in FIG. 2A and the same or similar reference numbers in the two embodiments represent the same or similar elements or components. The top substrate 204B shown in FIG. 2B differs from the top substrate 204A shown in FIG. 2A as a portion 112b of the protective layer 112' may be also disposed on the hydrophobic layer 111 in the second region 102, in addition to a portion 112a of the protective layer 112' disposed on top of the patterned light shielding layer 103. The portion 112a and the portion 112b of the protective layer 112' may have the same thickness. Alternatively, a thickness of the protective layer 112' may vary, so that in some embodiments, a top surface S3 of the portion 112a may be coplanar with a top surface S5 of the portion 112b on top of the hydrophobic layer 111. In the present embodiment, the protective layer 112' is located in both the first region 101 and the second region 102 so that the outermost surface of the top substrate 204B may have a uniformed property that is determined by the protective layer 112'. Comparatively, the top substrate 204A may have greater hydrophobic property in the second region 102 than the first region 101. However, this is not construed as a limitation to the disclosure.

Figure 2C:
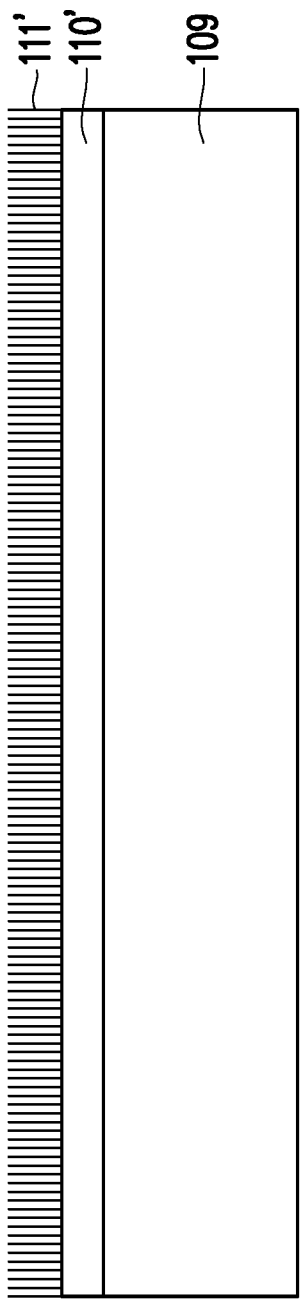
Figure 2D:
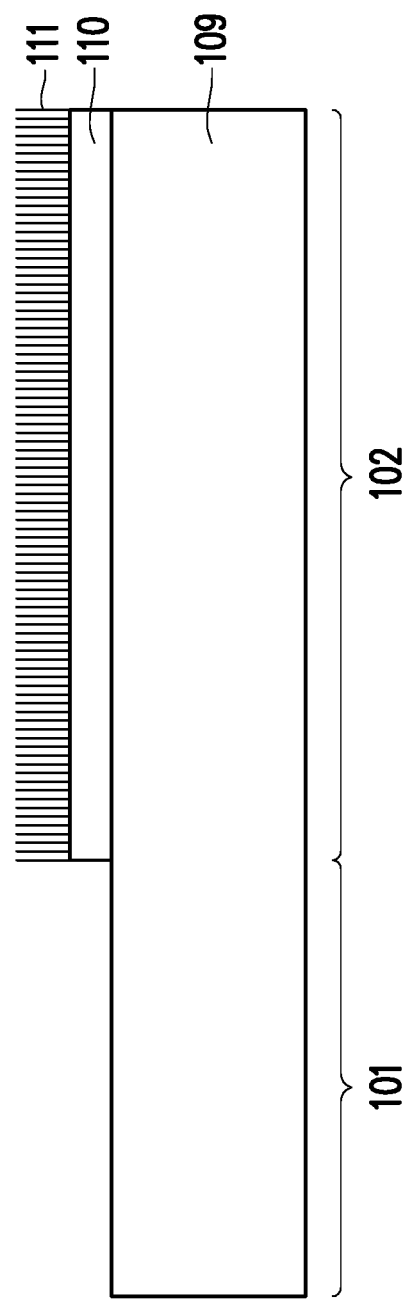

FIGS. 2C-2E shows schematic cross sections of a top substrate undergoing a portion of the steps of fabricating a top substrate of a display panel in accordance with an embodiment of the present disclosure. In the embodiment, as shown in FIG. 2C, a blanket anti-reflective layer 110' may be formed on the support plate 109, and a blanket surface functionalization may be performed with hydrophobic material, for example with silanes, to generate a hydrophobic layer 111' on the entire blanket anti-reflective layer 110'.

Subsequently, as shown in FIG. 2D, the blanket anti-reflective layer 110' on the support plate 109 may be patterned to form the patterned anti-reflective layer 110 with the hydrophobic layer 111 thereon by removing the portion of the blanket anti-reflective layer 110' at the first region 101. Therefore, the patterned anti-reflective layer 110 is blanked out and absent in the first region 101. In the step, the blanket anti-reflective layer 110' may be patterned by shielding the blanket anti-reflective layer 110' at the second region 102 using a mask and removing the blanket anti-reflective layer 110' at the first region 101 using a dry etching process such as a plasma bombardment or a wet etching process. Dry and wet etching processes are known technologies, which do not constitute the limitation of this disclosure.

Thereafter, as shown in FIG. 2E, the patterned light shielding layer 103 is formed on the support plate 109 at the first region 101 via a wet process such as ink-jet, super ink-jet, screen or APR printing. In the present embodiment, the top surface S2 of the patterned anti-reflective layer 110 is more hydrophobic than the exposed outer surface S0 of the support plate 109 in the first region 101, such that the ink material may evenly spread over the first region 101 without spilling into the second region 102 during the printing process. Accordingly, the ink material may be evenly distributed and firmly restricted within the first region 101. Thereafter, a curing process can be performed to solidify the ink material to form the patterned light shielding layer 103. Particularly, the patterned light shielding layer 103 may present sharp edges with good linearity. In the present embodiment, owing that the step of FIG. 2D may render the outer surface S0 of the support plate 109 in the first region 101 rough, the ink material for forming the patterned light shielding layer 103 may contact the outer surface S0 of the support plate 109 with an enhanced contact area so as to improve the connection between the support plate 109 and the patterned light shielding layer 103.

After the step of FIG. 2E, the protective layer 112 shown in FIG. 2A or the protective layer 112' shown in FIG. 2B may be formed to cover the patterned light shielding layer 130. The formation of the protective layer 112 or 112' could be done by sputtering, thermal evaporation or atomic layer deposition. Deposition protocols are known technologies, which do not constitute the limitation of this disclosure. In some alternative embodiments, the hydrophobic layer 111 on the patterned anti-reflective layer 110 may be removed after forming the patterned light shielding layer 103 such that the hydrophobic layer 111 may be absent in both the first region 101 and the second region 102. As such, the portion 112b of the protective layer 112' shown in FIG. 2B may be in contact with the patterned anti-reflective layer 110 at the second region 102 without the hydrophobic layer 111 therebetween.

Figure 2G:
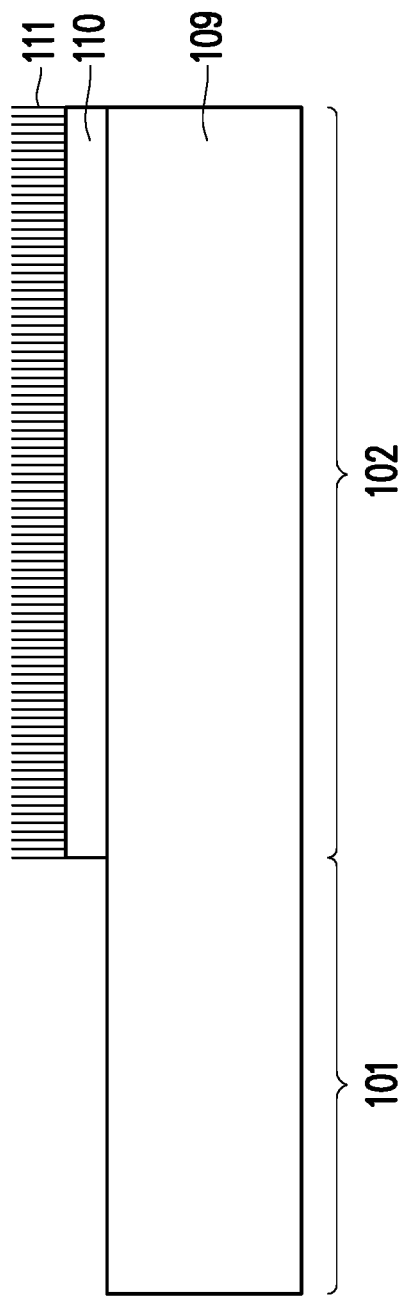

FIG. 2F-2G shows schematic cross sections of a top substrate undergoing a portion of the steps of fabricating a top substrate in accordance with another embodiment of the present disclosure. In the present embodiment, as shown in FIG. 2F, the patterned anti-reflective layer 110 is formed on the support plate 109 by patterning an anti-reflective layer which is not treated by a hydrophobic modification. Subsequently, as shown in FIG. 2G, a hydrophobic modification is performed on the patterned anti-reflective layer 110 to form the hydrophobic layer 111 on the patterned anti-reflective layer 110. Subsequent to the formation of the hydrophobic layer 111, the step of FIG. 2E and the step of forming the protective layer 112 or 112' may be performed to fabricate the top substrate 204A or the top substrate 204B.

Specifically, in the step of FIG. 2G, the hydrophobic layer 111 may not be formed on the support plate 109 at the first region 101. For example, a mask may be used for shielding the first region 101 during performing the hydrophobic modification and the mask may be removed thereafter, such that the hydrophobic layer 111 may not extend to the first region 101. Alternatively, a blanket surface functionalization may be performed with hydrophobic material, for example with silanes, on both the first and the second regions 101 and 102, and in the following, a patterning process may be further performed to remove the hydrophobic material distributed in the first region 101. In one instance, the removing of the hydrophobic material distributed in the first region 101 may be achieved by irradiating a UV light with a wavelength of about 200 nm onto the first region 101 while the second region 102 is shielded so that the hydrophobic material in the first region 101 may be degraded or decomposed and the hydrophobic material in the second region 102 may retain to form the hydrophobic layer 111.

Figure 3A:
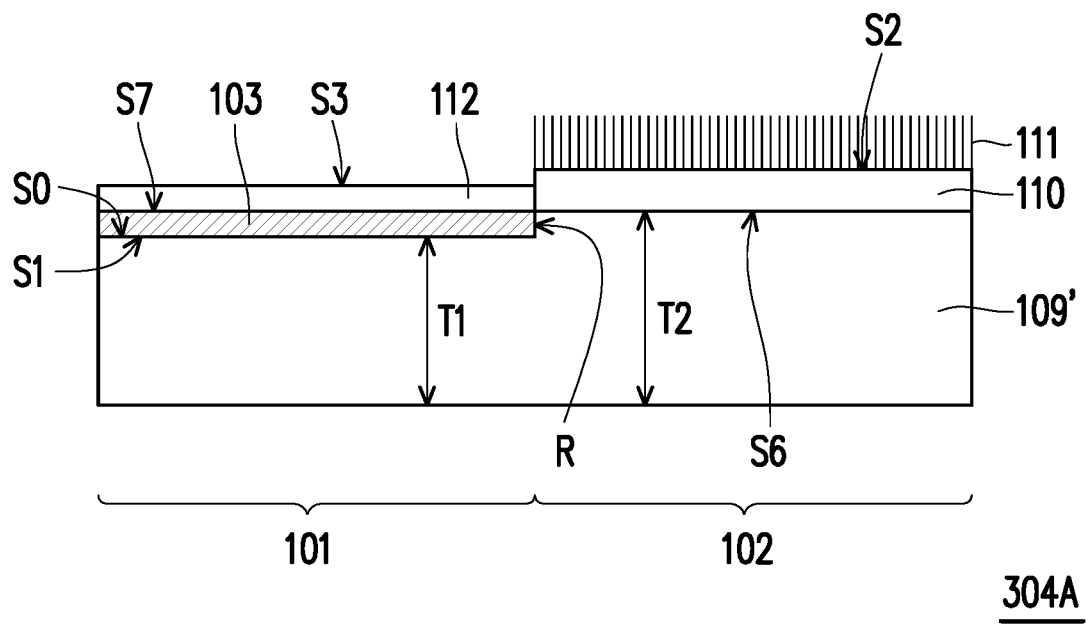
FIG. 3A schematically illustrates an expanded view of a cross section of a top substrate of a display panel according to another embodiment of the present disclosure.

FIG. 3A schematically illustrates an expanded view of a cross section of a top substrate 304A of a display panel according to another embodiment of the present disclosure. The expanded view of the top substrate 304A shown in FIG. 3A corresponds to an area A delineated in FIG. 1B. The structure of the top substrate 304A shown in FIG. 3A may be an exemplary implementing example of the top substrate 104 of the display panel 100. Referring to FIG. 3A, a top substrate 304A is similar to the top substrate 204A and the same or similar reference numbers in the two embodiments represent the same or similar elements or components. Specifically, the top substrate 304A may include a support plate 109', a patterned light shielding layer 103, a patterned anti-reflective layer 110, and a protective layer 112. The patterned anti-reflective layer 110 may have a top surface S2 modified by addition of a hydrophobic layer 111. Specifically, the top substrate 304A may be fabricated by using the steps depicted in FIGS. 2C-2E or FIGS. 2F-2G, where the step of FIG. 2D or FIG. 2F may further remove a portion of the support plate 109' at the first region 101. In the present embodiment, the patterned light shielding layer 103 is entrenched in the support plate 109' of the top substrate 304A. A thickness T1 of the support plate 109' in a first region 101 is smaller than a thickness T2 of the support plate 109' in a second region 102. In other words, a recess R exists in the support plate 109' so that an outer surface S0 of the support plate 109' where the patterned light shielding layer 103 is deposited lies below a plane defined by the bottom surface S6 of the patterned anti-reflective layer 110. Accordingly, the bottom surface S1 of the patterned light shielding layer 103 is at a level below a plane defined by the bottom surface S6 of the anti-reflective layer 110. In some embodiments, the thickness of the patterned light shielding layer 103 may be adjusted so that a top surface S7 of the patterned light shielding layer 103 may be coplanar with the bottom surface S6 of the anti-reflective layer 110, but the disclosure is not limited thereto. Owing that the patterned anti-reflective layer 110 and the recess R may be patterned by the same patterning step, the sidewall of the patterned anti-reflective layer 110 may be coplanar with the sidewall of the recess R; or, there may not exist an obvious step formed between the sidewall of the patterned anti-reflective layer 110 and the sidewall of the recess R.

Figure 3B:
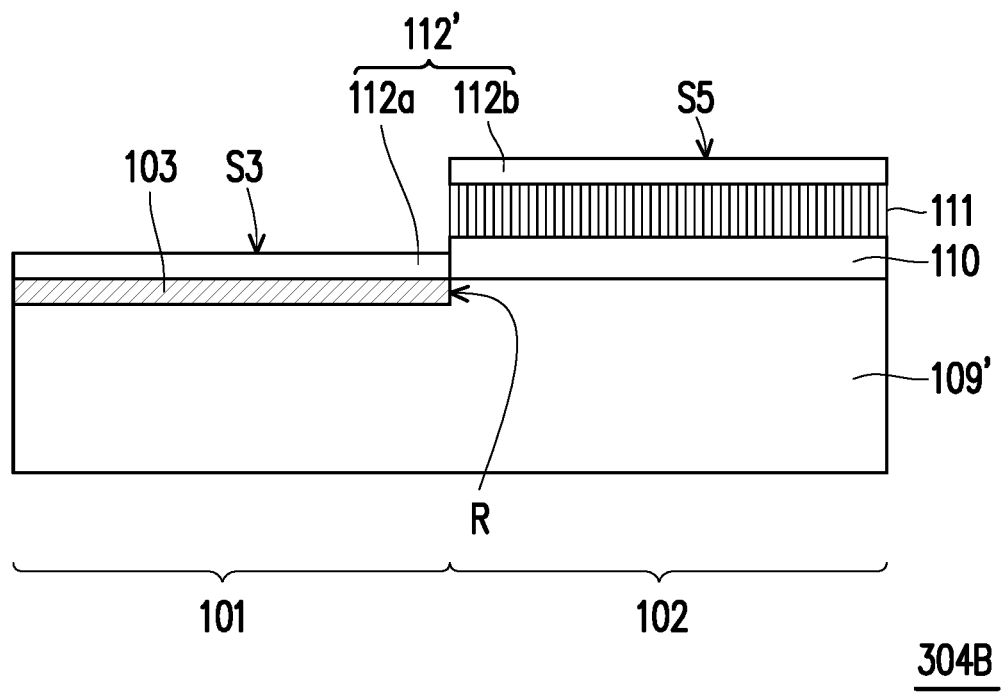
FIG. 3B shows an expanded view of a cross section of the top substrate of a display panel according to another embodiment of the present disclosure.

FIG. 3B shows an expanded view of a cross section of the top substrate of a display panel according to another embodiment of the present disclosure. The expanded view of the top substrate 304B shown in FIG. 3B corresponds to an area A delineated in FIG. 1B. The structure of the top substrate 304B shown in FIG. 3B may be an exemplary implementing example of the top substrate 104 of the display panel 100. The top substrate 304B shown in FIG. 3B is similar to the top substrate 304A shown in FIG. 3A and the same or similar reference numbers in the two embodiments represent the same or similar elements or components. As shown in FIG. 3B, the top substrate 304B differs from the top substrate 304A as a portion 112b of the protective layer 112' may be also disposed on the hydrophobic layer 111 in the second region 102, in addition to a portion 112a of the protective layer 112' disposed on top of the patterned light shielding layer 103. The portion 112a and the portion 112b of the protective layer 112' may have the same thickness. Alternatively, a thickness of the protective layer 112' may vary, so that in some embodiments, a top surface S3 of the portion 112a may be coplanar with a top surface S5 of the portion 112b on top of the hydrophobic layer 111.

Figure 4A:
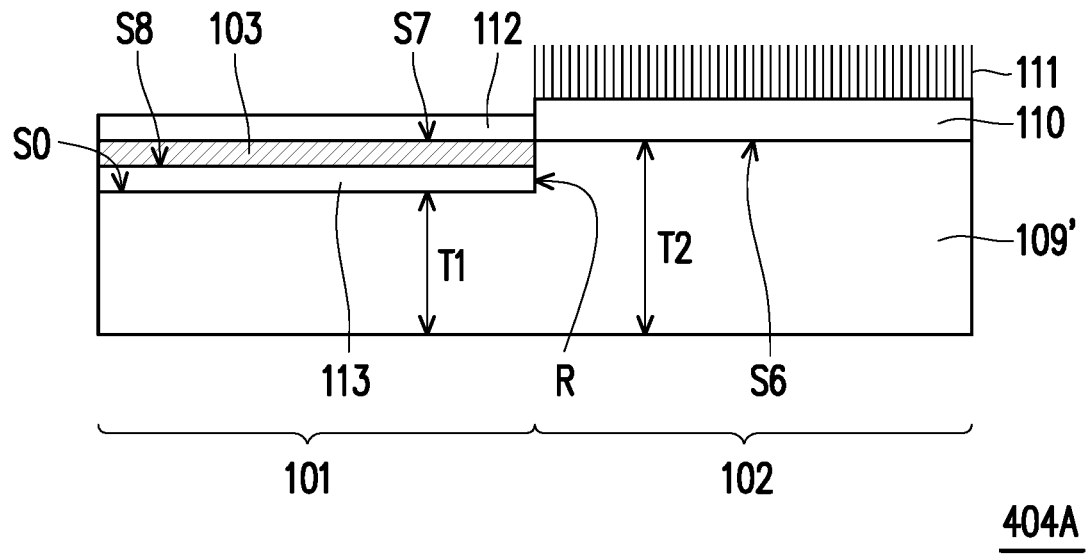
FIG. 4A schematically illustrates an expanded view of a cross section of a top substrate of a display panel according to another embodiment of the present disclosure.

FIG. 4A schematically illustrates an expanded view of a cross section of a top substrate of a display panel according to another embodiment of the present disclosure. The expanded view of the top substrate 404A shown in FIG. 4A corresponds to an area A delineated in FIG. 1B. Referring to FIG. 4A, a top substrate 404A is similar to the top substrate 304A and the same or similar reference numbers in the two embodiments represent the same or similar elements or components. Specifically, the top substrate 404A may include a support plate 109', a patterned light shielding layer 103, a patterned anti-reflective layer 110, and a protective layer 112, and further include an underlying layer 113. The support plate 109' may have a recess R at the first region 101, wherein the underlying layer 113 and the patterned light shielding layer 103 are sequentially disposed in the recess R. However, in some alternative embodiments, the support plate 109' may be replaced by the support plate 109 shown in FIG. 2A. Namely, the recess R may not exist in some embodiments so that the underlying layer 113 is disposed on the same plane as the patterned anti-reflective layer 110.

The underlying layer 113 is disposed between the patterned light shielding layer 103 and the support plate 109' at the first region 101. More specifically, the underlying layer 113 may be in direct contact with the outer surface S0 of the support plate 109 in the recess R, and have a top surface S8 in direct contact with the patterned light shielding layer 103. A material for the underlying layer 113 may be an oxide; for example, the underlying layer 113 may be made of $SiO_2$, but it is not limited thereto.

In the present embodiment, a thickness T1 of the support plate 109' in a first region 101 of the display is smaller than a thickness T2 of the support plate 109' in a second region 102. In other words, a recess R exists in the support plate 109'. The outer surface S0 of the support plate 109' where the underlying layer 113 and the patterned light shielding layer 103 are deposited lies below the plane defined by the bottom surface S6 of the patterned anti-reflective layer 110. Both the underlying layer 113 and the patterned light shielding layer 103 are entrenched in the support plate 109' of the top substrate 404A. In some embodiments, a top surface S7 of the patterned light shielding layer 103 may be coplanar with the bottom surface S6 of the anti-reflective layer 110.

In the present embodiment, the top substrate 404A may be fabricated by performing the steps of FIGS. 2C-2E, where the step of FIG. 2D may further remove a portion of the support plate 109' in the first region 101 and the underlying layer 113 may be formed before the step of FIG. 2E. In addition, before the step of FIG. 2E, the underlying layer 113 is formed in the recess R located in the first region 101. In some alternative embodiments, the top substrate 404A may be fabricated by performing the steps of FIGS. 2F-2G, where the step of FIG. 2F may further remove a portion of the support plate 109' in the first region 101. In addition, the step of FIG. 2G may be followed by forming the underlying layer 113 in the recess R located in the first region 101 and subsequently forming the patterned light shielding layer 103. In some further alternative embodiments, the step of forming the underlying layer 113 in the recess R may be performed before the step of FIG. 2G (forming the hydrophobic layer 111 in the second region 102) and the step of forming the patterned light shielding layer 103 may be performed after the step of FIG. 2G. Owing that the patterned anti-reflective layer 110 and the recess R may be patterned by the same patterning step, the sidewall of the patterned anti-reflective layer 110 may be coplanar with the sidewall of the recess R; or, there may not exist an obvious step formed between the sidewall of the patterned anti-reflective layer 110 and the sidewall of the recess R.

Figure 4B:
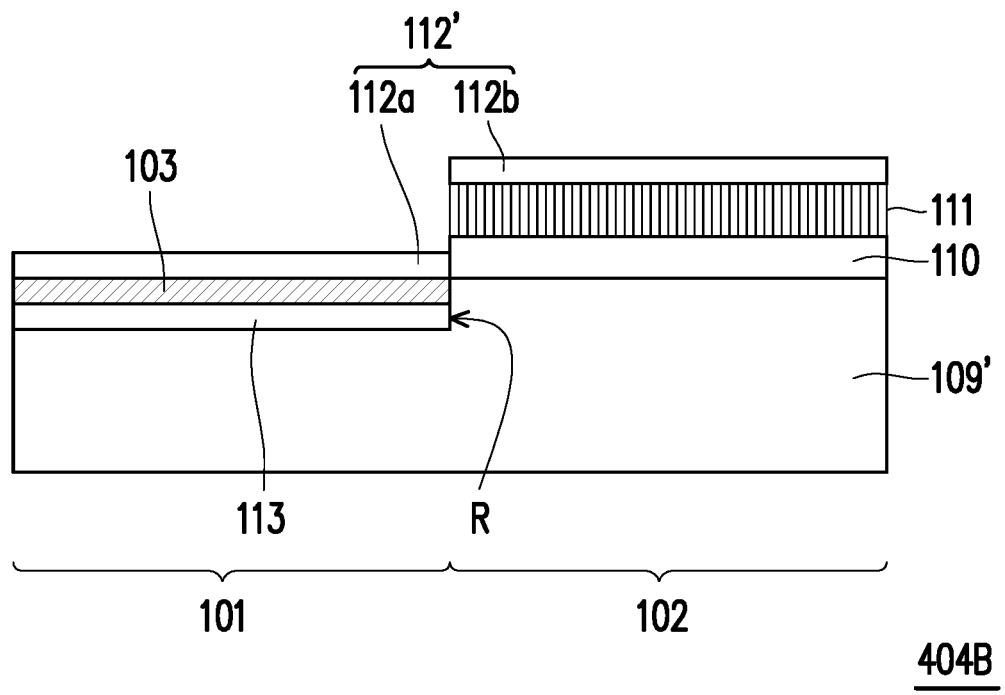
FIG. 4B shows an expanded view of a cross section of the top substrate of a display panel according to another embodiment of the present disclosure.

FIG. 4B shows an expanded view of a cross section of the top substrate of a display panel according to another embodiment of the present disclosure. The expanded view of the top substrate 404B shown in FIG. 4B corresponds to an area A delineated in FIG. 1B. The structure of the top substrate 404B shown in FIG. 4B may be an exemplary implementing example of the top substrate 104 of the display panel 100. The top substrate 404B shown in FIG. 4B is similar to the top substrate 404A shown in FIG. 4A and the same or similar reference numbers in the two embodiments represent the same or similar elements or components. As shown in FIG. 4B, the top substrate 404B differs from the top substrate 404A as a portion 112b of the protective layer 112' may be also disposed on the hydrophobic layer 111 in the second region 102, in addition to a portion 112a of the protective layer 112' disposed on top of the patterned light shielding layer 103.

Figure 4C:
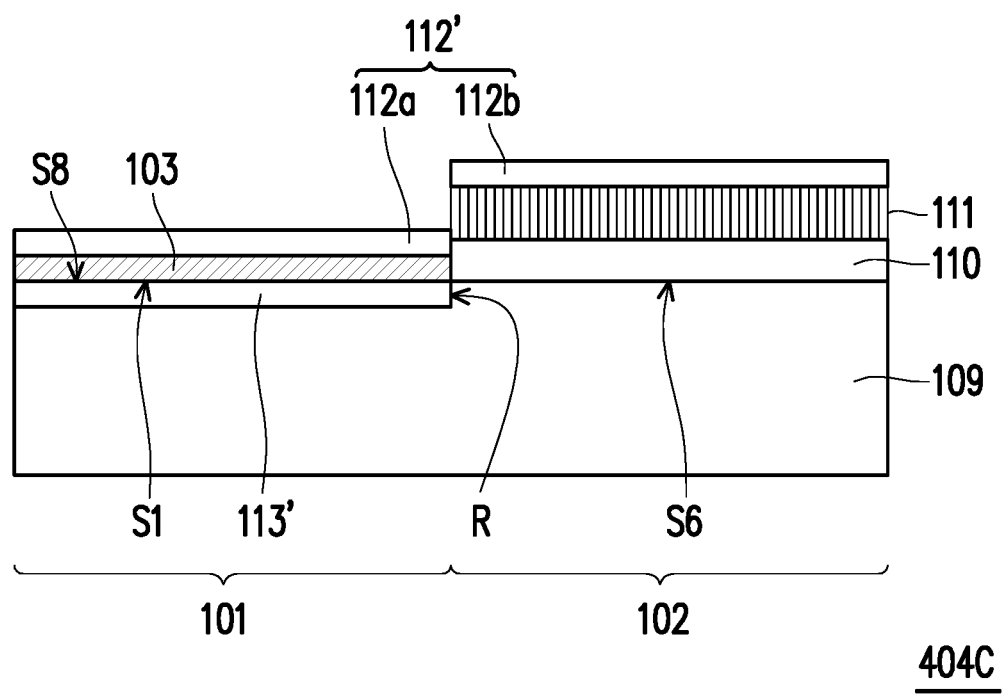
FIG. 4C shows an expanded view of a cross section of the top substrate of a display panel according to another embodiment of the present disclosure.

FIG. 4C shows an expanded view of a cross section of the top substrate of a display panel according to another embodiment of the present disclosure. The top substrate 404C differs from the top substrate 404B as the thickness of the underlying layer 113'. In the top substrate 404C, as shown in FIG. 4C, a top surface S8 of the underlying layer 113' may be coplanar with a bottom surface S6 of the anti-reflective layer 110, or, equivalently, the bottom surface S1 of the patterned light shielding layer 103 may be coplanar with the bottom surface S6 of the anti-reflective layer 110. Namely, the patterned light shielding layer 103 may be disposed on a plane the same as the patterned anti-reflective layer 110 and the thickness of the underlying layer 113' may be substantially the same as the depth of the recess R.

Figure 5A:
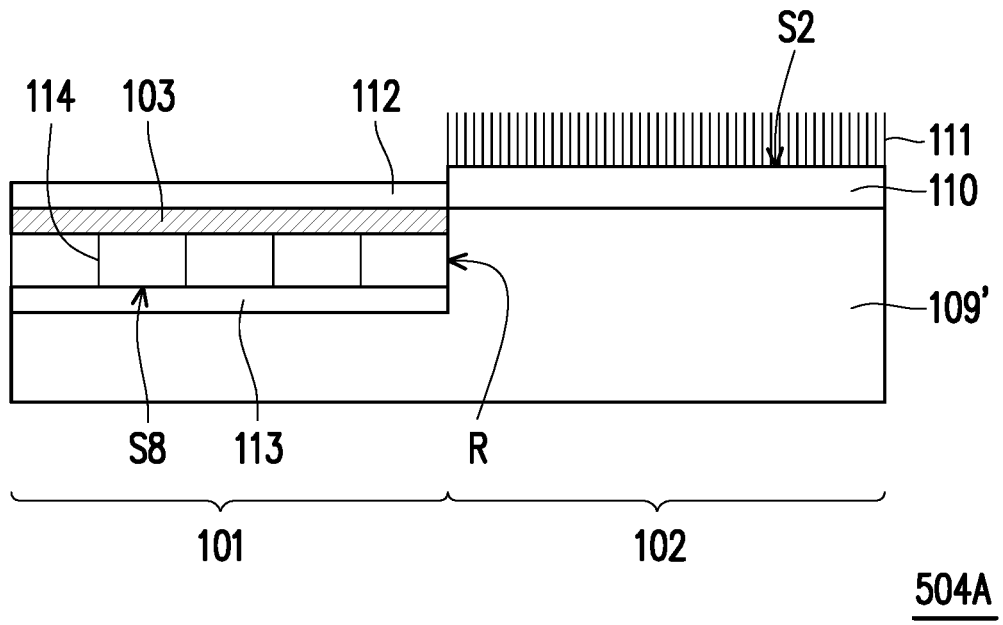
FIG. 5A schematically illustrates an expanded view of a cross section of a top substrate of a display panel according to another embodiment of the present disclosure.

FIG. 5A schematically illustrates an expanded view of a cross section of a top substrate of a display panel according to another embodiment of the present disclosure. The expanded view of the top substrate 504A shown in FIG. 5A corresponds to an area A delineated in FIG. 1B. The structure of the top substrate 504A shown in FIG. 5A may be an exemplary implementing example of the top substrate 104 of the display panel 100. Referring to FIG. 5A, a top substrate 504A is similar to the top substrate 404A discussed above and the same or similar reference numbers in the two embodiments represent the same or similar elements or components. The top substrate 504A may include a support plate 109', a patterned light shielding layer 103, a patterned anti-reflective layer 110, a protective layer 112, and an underlying layer 113.

A top surface S8 of the underlying layer 113 may be modified, such that a hydrophobic layer 114 may be formed above the underlying layer 113. In an embodiment, a hydrophobic material used to form the hydrophobic layer 114 may include silanes, fluorinated silanes, long-chain alcohols or acids, but is not limited thereto. In one embodiment, the hydrophobic material used to form the hydrophobic layer 114 may be the same material constituting the hydrophobic layer 111 on the top surface S2 of the patterned anti-reflective layer 110, but in other embodiments the two hydrophobic layers 114 and 111 may be made of different materials.

Figure 5B:
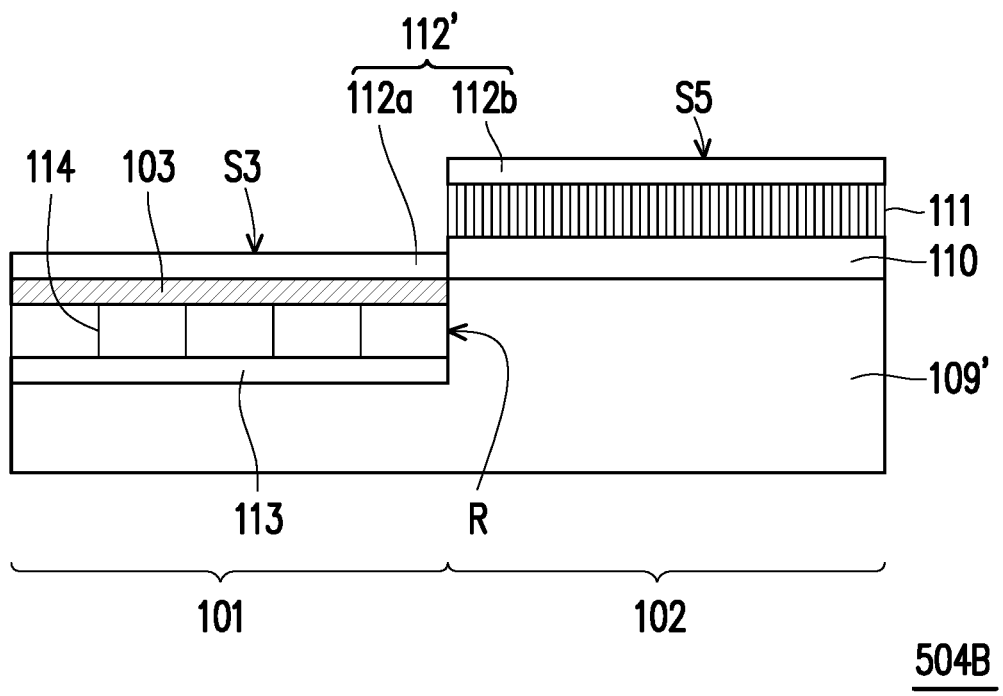
FIG. 5B shows an expanded view of a cross section of the top substrate of a display panel according to another embodiment of the present disclosure.

FIG. 5B shows an expanded view of a cross section of the top substrate of a display panel according to another embodiment of the present disclosure. The expanded view of the top substrate 504B shown in FIG. 5B corresponds to an area A delineated in FIG. 1B. The structure of the top substrate 504B shown in FIG. 5B may be an exemplary implementing example of the top substrate 104 of the display panel 100. The top substrate 504B shown in FIG. 5B is similar to the top substrate 504A shown in FIG. 5A and the same or similar reference numbers in the two embodiments represent the same or similar elements or components. The top substrate 504B shown in FIG. 5B differs from the top substrate 504A shown in FIG. 5A as a portion 112b of the protective layer 112' may be also disposed on the hydrophobic layer 111 in the second region 102, in addition to a portion 112a of the protective layer 112' disposed on top of the patterned light shielding layer 103. The portion 112a and the portion 112b of the protective layer 112' may have the same thickness. Alternatively, a thickness of the protective layer 112' may vary, so that in some embodiments, a top surface S3 of the portion 112a may be coplanar with a top surface S5 of the portion 112b on top of the hydrophobic layer 111.

Figure 5C:
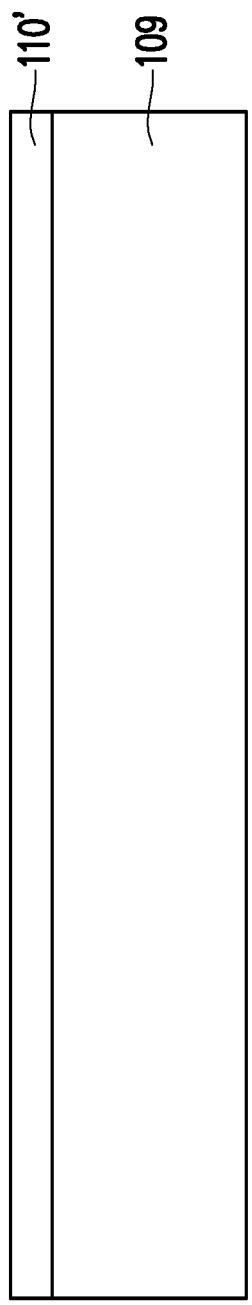
FIGS. 5C-5F shows schematic cross sections view of a top substrate undergoing a portion of the steps of fabricating a top substrate in accordance with an embodiment of the present disclosure.
Figure 5D:
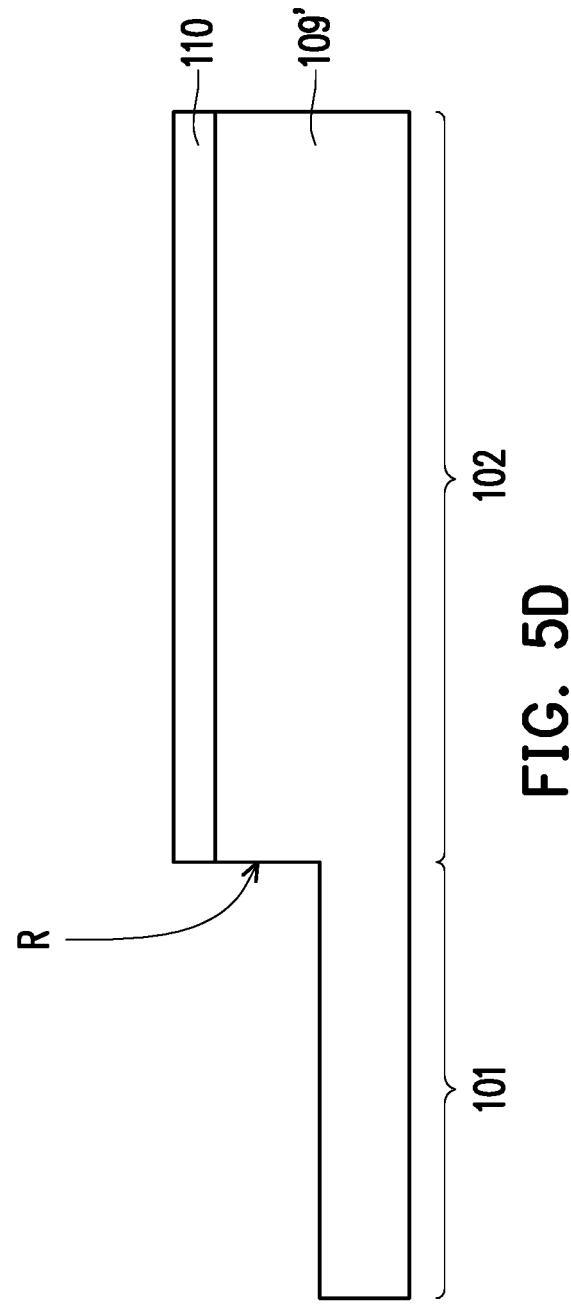
Figure 5E:
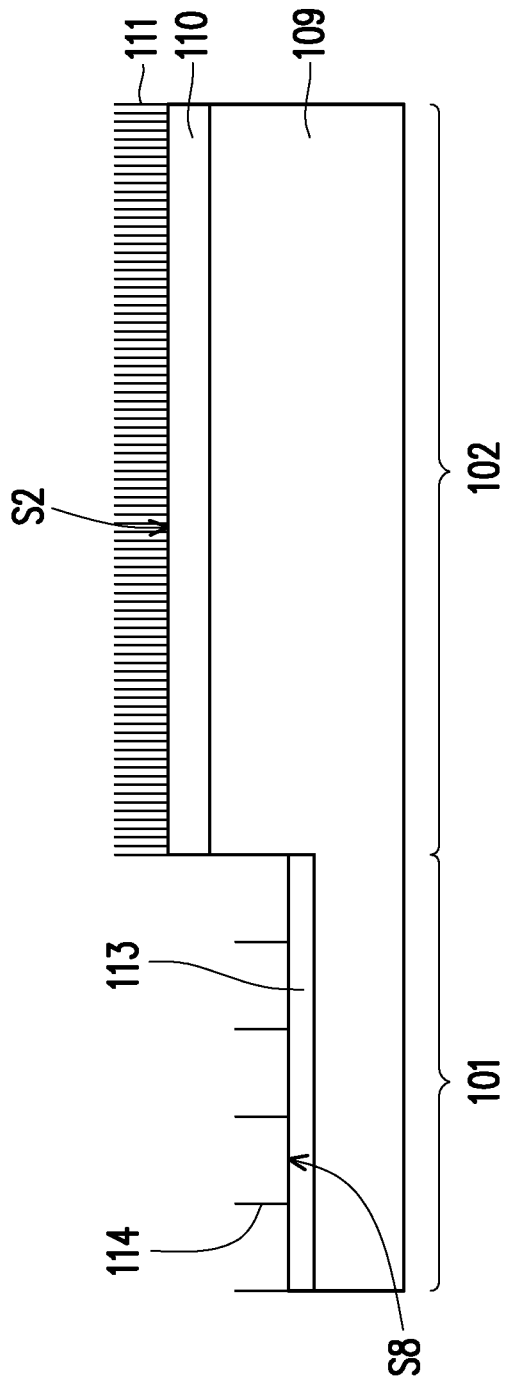

FIGS. 5C-5E shows schematic cross sections view of a top substrate undergoing a portion of the steps of fabricating a top substrate in accordance with an embodiment of the present disclosure. In the embodiment, as shown in FIG. 5C, a blanket anti-reflective layer 110' may be formed on the support plate 109. Subsequently, as shown in FIG. 5D, the blanket anti-reflective layer 110' on the support plate 109 may be patterned to form the patterned anti-reflective layer 110 and a portion of the support plate 109 in the first region 101 may be removed concurrently. Therefore, the support plate 109' with a recess R in the first region 101 and the patterned anti-reflective layer 110 blanked out at the first region 101 are formed. In other words, during the step of patterning the blanket anti-reflective layer 110', the support plate 109' in the first region 101 is thinned concurrently so that the thickness of the support plate 109' in the first region 101 is smaller than that in the second region 102 to define the recess R.

Thereafter, as shown in FIG. 5E, an underlying layer 113 is formed on the support plate 109' in the first region 101, and a hydrophobic layer 114 and a hydrophobic layer 111 are formed on the underlying layer 113 and the patterned anti-reflective layer 110, respectively. The distribution density of the hydrophobic material on the underlying layer 113 is less than the distribution density of the hydrophobic material on the patterned anti-reflective layer 110. Namely, the hydrophobic layer 114 may be less hydrophobic than the hydrophobic layer 111.

In some embodiments, the material of the underlying layer 113 and the material of the patterned anti-reflective layer 110 may be different, and the hydrophobic layer 114 and the hydrophobic layer 111 may be formed simultaneously by performing the same hydrophobic modification on tops of the underlying layer 113 and the patterned anti-reflective layer 110. For example, the underlying layer 113 may have the top surface S8 presenting free hydroxyl groups available to react with hydrophobic molecules, but it might be less effective than the top surface S2 of the anti-reflective layer 110 in the surface functionalization reaction. A material of the patterned anti-reflective layer 110 may be more reactive during the surface treatment or modification process than a material of the underlying layer 113. Therefore, after subjected to the same hydrophobic modification, the distribution density of the hydrophobic material on the underlying layer 113 is less than the distribution density of the hydrophobic material on the patterned anti-reflective layer 110.

In some alternative embodiments, the top surface S2 of the patterned anti-reflective layer 110 may subject to a more enhanced hydrophobic modification than the top surface S8 of the underlying layer 113 to achieve the distribution density of the hydrophobic material on the underlying layer 113 being less than the distribution density of the hydrophobic material on the patterned anti-reflective layer 110. For example, the top surface S8 of the underlying layer 113 may subject to the hydrophobic modification once and the top surface S2 of the patterned anti-reflective layer 110 may subject to the hydrophobic modification twice or more.

Figure 5F:
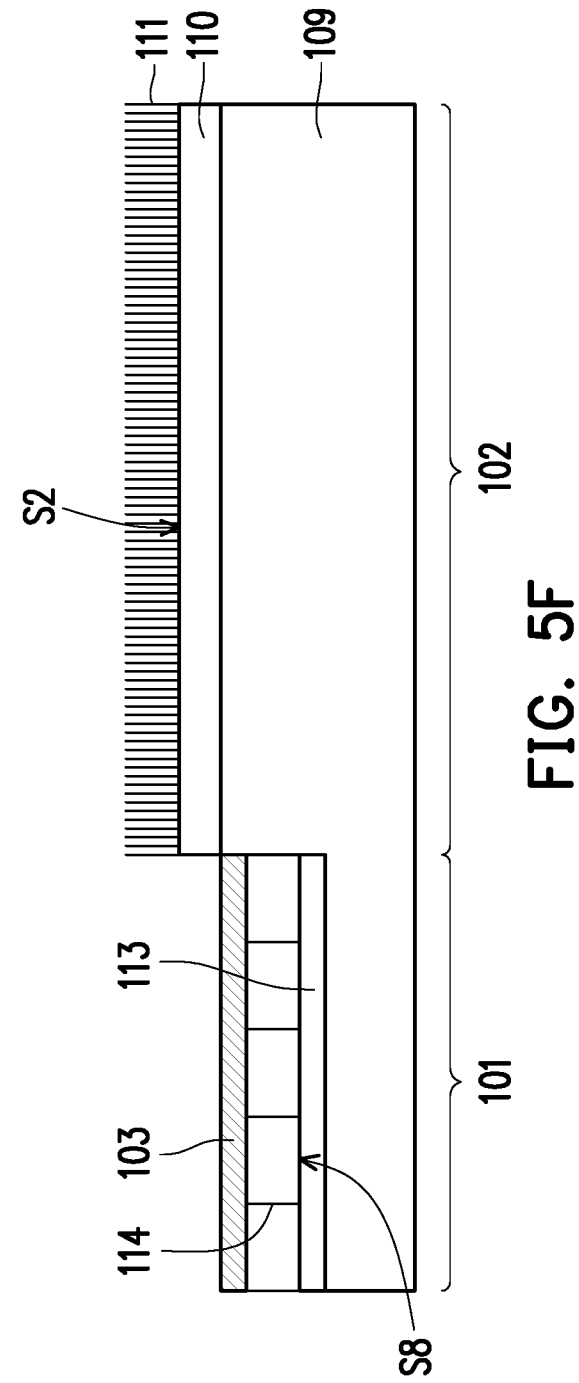

Subsequent to the step of forming the hydrophobic layer 114 and the hydrophobic layer 111, as shown in FIG. 5F, the patterned light shielding layer 103 is formed on the underlying layer 113 via a wet process. Owing that the distribution density of the hydrophobic material on the underlying layer 113 is less than that on the patterned anti-reflective layer 110, the top surface S8 of the underlying layer 113 with the hydrophobic layer 114 thereon is less hydrophobic than the top surface S2 of the patterned anti-reflective layer 110 with the hydrophobic layer 111 thereon. Therefore, the patterned light shielding layer 103 formed by using wet process may have good edge linearity. Subsequent to the formation of the patterned light shielding layer 103, the protective layer 112 shown in FIG. 5A or the protective layer 112' shown in FIG. 5B may be formed on the patterned light shielding layer 103 to finish the top substrate 504A or 504B.

Figure 6A:
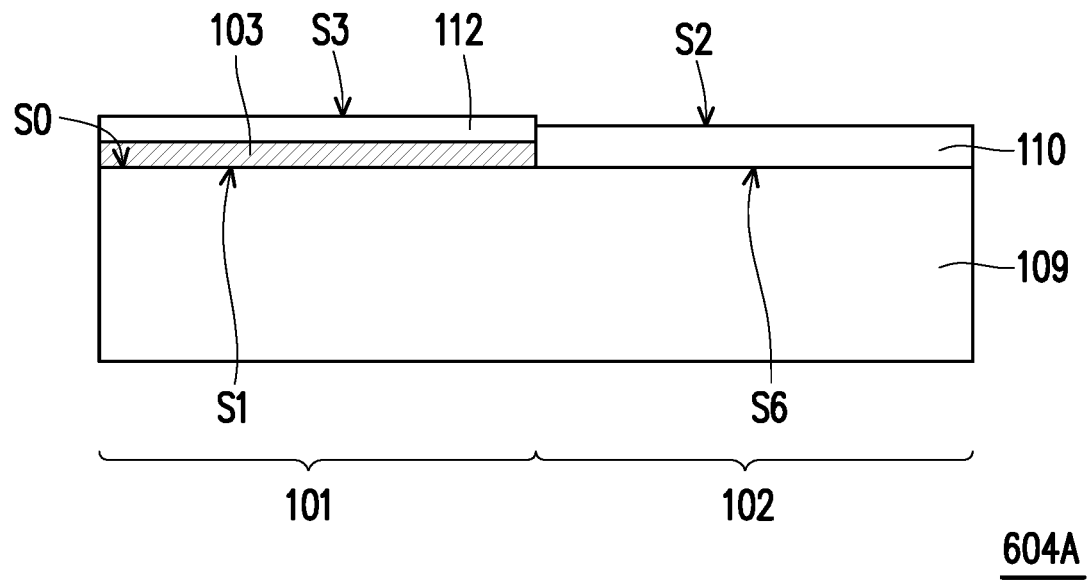
FIG. 6A schematically illustrates an expanded view of a cross section of a top substrate of a display panel according to another embodiment of the present disclosure.

FIG. 6A schematically illustrates an expanded view of a cross section of a top substrate of a display panel according to another embodiment of the present disclosure. The expanded view of the top substrate 604A shown in FIG. 6A corresponds to an area A delineated in FIG. 1B. The structure of the top substrate 604A shown in FIG. 6A may be an exemplary implementing example of the top substrate 104 of the display panel 100. Referring to FIG. 6A, a top substrate 604A is similar to the top substrate 204A and the same or similar reference numbers in the two embodiments represent the same or similar elements or components. Specifically, the top substrate 604A may include a support plate 109, a patterned light shielding layer 103, a patterned anti-reflective layer 110, and a protective layer 112. The bottom surface S1 of the patterned light shielding layer 103 may be coplanar with a bottom surface S6 of the patterned anti-reflective layer 110. In some embodiments, the top surface S3 of the protective layer 112 may be coplanar with the top surface S2 of the anti-reflective layer 110. In the present embodiment, there may be no hydrophobic material formed on the patterned anti-reflective layer 110. For example, the top substrate 604A may be fabricated by performing the step of FIG. 2F followed by performing a super ink jet printing directly on top of the outer surface S0 of the support plate 109 in the first region 101. Super ink jet printing is an improved version of the ink jet printing that produces drops smaller than 1 fL (1 fL=$10^{-15}$ L), and thus it achieves sub μm resolution when patterns are formed thereby. Therefore, without a surface treatment such as the hydrophobic modification, the patterned light shielding layer 103 has desirable pattern with good edge linearity. However, in some alternative embodiments, the top substrate 604A may be fabricated by performing the steps depicted in FIGS. 2C-2E and further removing the hydrophobic layer 111 on the patterned anti-reflective layer 110 after the formation of the patterned light shielding layer 103. In addition, the step of forming the patterned light shielding layer 103 in any of the above embodiments may adopt the super ink jet printing process, such that the hydrophobic layer 111 in the previous embodiments facilitates the desired edge linearity of the patterned light shielding layer 103.

Figure 6B:
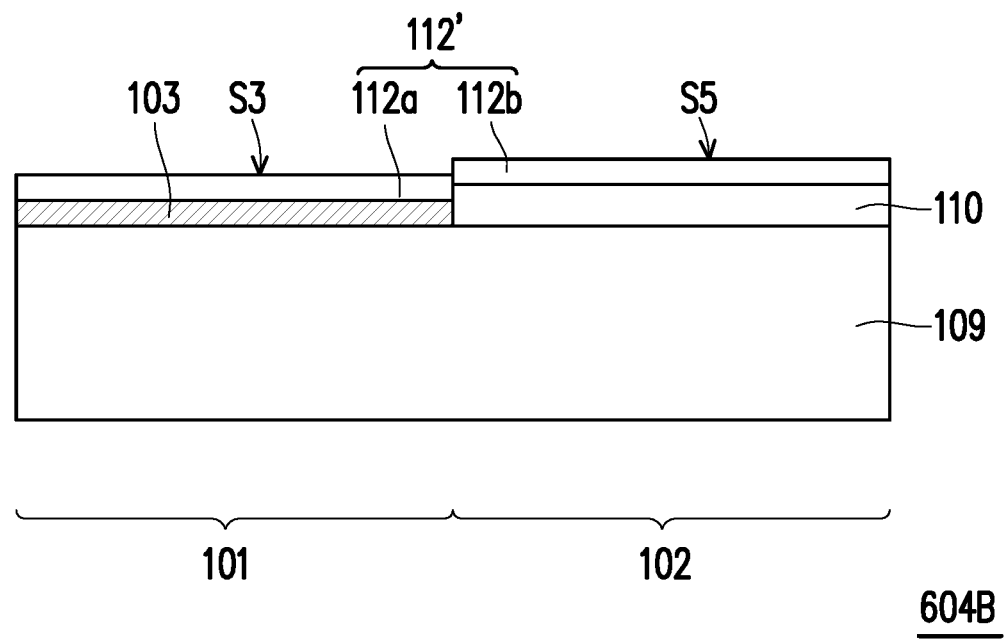
FIG. 6B shows an expanded view of a cross section of the top substrate of a display panel according to another embodiment of the present disclosure.

FIG. 6B shows an expanded view of a cross section of the top substrate of a display panel according to another embodiment of the present disclosure. The top substrate 604B differs from the top substrate 604A as a portion 112b of the protective layer 112' may be also disposed on the hydrophobic layer 111 in the second region 102, in addition to a portion 112a of the protective layer 112' disposed on top of the patterned light shielding layer 103. The portion 112a and the portion 112b of the protective layer 112' may have the same thickness. Alternatively, a thickness of the protective layer 112' may vary, so that in some embodiments, a top surface S3 of the portion 112a may be coplanar with a top surface S5 of the portion 112b on top of the patterned anti-reflective layer 110. In the present embodiment, the protective layer 112' is in direct contact with the patterned anti-reflective layer 110 and the patterned light shielding layer 103.

Figure 6C:
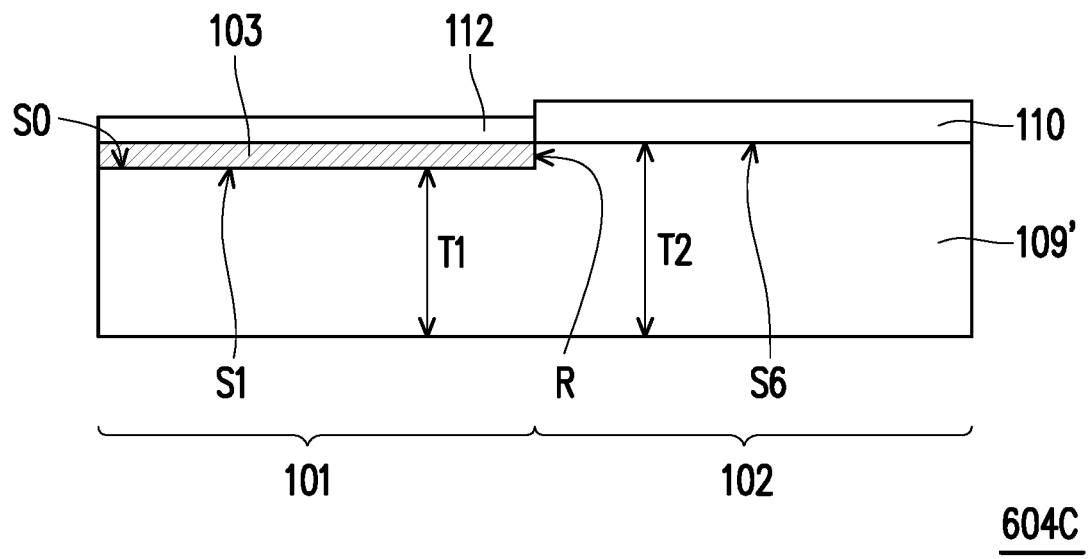
FIG. 6C schematically illustrates an expanded view of a cross section of a top substrate of a display panel according to another embodiment of the present disclosure.

FIG. 6C schematically illustrates an expanded view of a cross section of a top substrate of a display panel according to another embodiment of the present disclosure. Referring to FIG. 6C, a top substrate 604C is similar to the top substrate 604A and the same or similar reference numbers in the two embodiments represent the same or similar elements or components. Specifically, as shown in FIG. 6C, the top substrate 604C may include a support plate 109' having a recess R, a patterned light shielding layer 103, a patterned anti-reflective layer 110, and a protective layer 112. In the present embodiment, the patterned light shielding layer 103 is entrenched in the support plate 109' of the top substrate 604C. A thickness T1 of the support plate 109' in a first region 101 is smaller than a thickness T2 of the support plate 109' in a second region 102. In other words, a recess R exists in the support plate 109' so that an outer surface S0 of the support plate 109' where the patterned light shielding layer 103 is deposited lies below a plane defined by the bottom surface S6 of the patterned anti-reflective layer 110. Accordingly, the bottom surface S1 of the patterned light shielding layer 103 is at a level below a plane defined by the bottom surface S6 of the anti-reflective layer 110. In the present embodiment, there may be no hydrophobic material formed on the patterned anti-reflective layer 110. For example, the top substrate 604C may be fabricated by performing the step of FIG. 5D followed by performing a super ink jet printing directly on top of the outer surface S0 of the support plate 109 in the first region 101 and subsequently forming the protective layer 112 on the patterned light shielding layer 103. As such, the hydrophobic modification may be omitted to improve the fabrication efficiency.

Figure 6D:
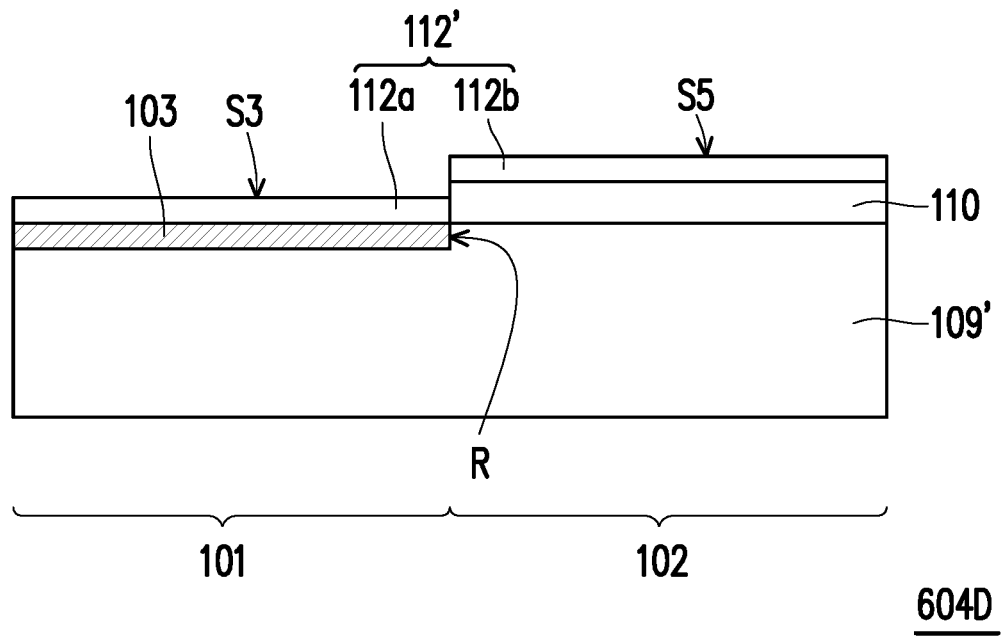
FIG. 6D shows an expanded view of a cross section of the top substrate of a display panel according to another embodiment of the present disclosure.

FIG. 6D shows an expanded view of a cross section of the top substrate of a display panel according to another embodiment of the present disclosure. As shown in FIG. 6D, the top substrate 604D differs from the top substrate 604C as a portion 112b of the protective layer 112' may be also disposed on the patterned anti-reflective layer 110 in the second region 102, in addition to a portion 112a of the protective layer 112' disposed on top of the patterned light shielding layer 103. The portion 112a and the portion 112b of the protective layer 112' may have the same thickness. Alternatively, a thickness of the protective layer 112' may vary, so that in some embodiments, a top surface S3 of the portion 112a may be coplanar with a top surface S5 of the portion 112b on top of the patterned anti-reflective layer 110. Herein, the portion 112b of the protective layer 112' may be in direct contact with the patterned anti-reflective layer 110 without the hydrophobic material therebetween.

In light of the foregoing, the display panel according to an embodiment of the disclosure includes a patterned light shielding layer and a patterned anti-reflective layer formed on the support plate of the top substrate. The pattern anti-reflective layer is disposed at the region where the patterned light shielding layer is not disposed. The patterned anti-reflective layer may be functionalised with hydrophobic material; or the patterned light shielding layer may be formed by a super inject printing process. Accordingly, the patterned light shielding layer of the display panel may be formed on top of the display panel via a wet process and have a sharp pattern to provide the desirable light shielding effect.

It will be apparent to those skilled in the art that various modifications and variations can be made to the structure of the present invention without departing from the scope or spirit of the invention. In view of the foregoing, it is intended that the present invention covers modifications and variations of this invention, provided these falls within the scope of the following claims and their equivalents.

What is claimed is:

1. A display panel comprising:
    a first region and a second region beside the first region, wherein the first region which is a non-display region surrounds the second region which is a display region, and the display panel further comprising:
    a top substrate, comprising:
        a support plate having an outer surface;
        a patterned anti-reflective layer disposed on the outer surface of the support plate and being blanked out at the first region;

a patterned light shielding layer disposed on the outer surface of the support plate and located within the first region;

a bottom substrate; and a display medium layer disposed between the top substrate and the bottom substrate, wherein the top substrate further comprises a protective layer disposed on the support plate and covering the patterned light shielding layer, and a top surface of the protective layer is coplanar with a top surface of the patterned anti-reflective layer.

2. The display panel according to claim 1, wherein the protective layer is located in both the first region and the second region.

3. The display panel according to claim 2, wherein the protective layer has a first thickness in the first region and a second thickness in the second region and the first thickness is greater than the second thickness.

4. The display panel according to claim 1, wherein the top substrate is more hydrophobic at the second region than at the first region.

5. The display panel according to claim 1, wherein a top surface of the patterned anti-reflective layer is modified and a hydrophobic layer is formed on the top surface of the patterned anti-reflective layer.

6. The display panel according to claim 1, wherein the top substrate further comprising an underlying layer disposed between the patterned light shielding layer and the support plate.

7. The display panel according to claim 6, wherein a top surface of the underlying layer is modified, and a hydrophobic layer is formed between the underlying layer and the patterned light shielding layer.

8. The display panel according to claim 6, wherein a material of the patterned anti-reflective layer is different from a material of the underlying layer.

9. The display panel according to claim 1, wherein the patterned light shielding layer is in direct contact with the support plate.

10. The display panel according to claim 1, wherein the support plate has a recess in the first region and the patterned light shielding layer is disposed in the recess.

11. The display panel according to claim 1, wherein a bottom surface of the patterned light shielding layer is coplanar to a bottom surface of the patterned anti-reflective layer.

12. The display panel according to claim 1, wherein a top surface of the patterned light shielding layer is coplanar to a bottom surface of the patterned anti-reflective layer.

13. A method of fabricating a top substrate of a display panel, wherein the display panel comprises a first region and a second region beside the first region, and the first region which is a non-display region surrounds the second region which is a display region, and the display panel further comprises the top substrate, a bottom substrate and a display medium layer between the top substrate and the bottom substrate, the method comprising:

providing a support plate with an anti-reflective layer thereon;

removing a portion of the anti-reflective layer in a first region to form a patterned anti-reflective layer being blanked out at the first region;

forming a patterned light shielding layer on the support plate in the first region where the portion of the anti-reflective layer is removed; and forming a protective layer covering the patterned light shielding layer, wherein a top surface of the protective layer is coplanar with a top surface of the patterned anti-reflective layer.

14. The method of claim 13, further forming a hydrophobic layer on the support plate with the patterned anti-reflective layer thereon through a hydrophobic modification before forming the patterned light shielding layer.

15. The method of claim 14, wherein the hydrophobic layer in the first region is removed before forming the patterned light shielding layer.

16. The method of claim 14, further forming an underlying layer on the support plate in the first region before the hydrophobic modification, wherein the hydrophobic layer is also formed on the underlying layer during the hydrophobic modification and a distribution density of hydrophobic material on the underlying layer is less than a distribution density of hydrophobic material on the patterned anti-reflective layer.

17. The method of claim 13, further forming an underlying layer on the support plate in the first region, wherein the patterned light shielding layer is formed on the underlying layer.

18. The method of claim 13, wherein the support plate is partially removed at the first region during patterning the anti-reflective layer into the patterned anti-reflective layer to have a recess.

19. The method of claim 13, wherein the protective layer further covers the anti-reflective layer in the second region.

20. The method of claim 13, wherein the patterned light shielding layer is formed on the support plate in the first region by performing an ink jet printing process.

21. The method of claim 13, wherein the patterned light shielding layer is formed on the support plate in the first region by performing a super ink jet printing process.

* * * * *